(12) United States Patent
Grable et al.

(10) Patent No.: US 7,364,237 B2
(45) Date of Patent: **\*Apr. 29, 2008**

(54) SEAT ASSEMBLY INCLUDING A TOOTHED PAWL INTERENGAGEABLE WITH A SEATBACK

(75) Inventors: David M. Grable, Clinton Township, MI (US); Stephen Bruck, Howell, MI (US); Eric Trombley, Chesterfield Township, MI (US); David L. Quittschreiber, Milford, MI (US)

(73) Assignee: BAE Industries, Inc., Centerline, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/188,426

(22) Filed: Jul. 25, 2005

(65) Prior Publication Data

US 2007/0029858 A1    Feb. 8, 2007

(51) Int. Cl.
*B60N 2/02* (2006.01)

(52) U.S. Cl. .................. 297/378.1; 297/367; 297/369; 297/378.12

(58) Field of Classification Search ............ 297/378.1, 297/378.13, 378.12, 367, 368, 369, 379.12
See application file for complete search history.

(56) References Cited

U.S. PATENT DOCUMENTS

| | | | |
|---|---|---|---|
| 3,973,288 A | 8/1976 | Pickles | 16/146 |
| 4,147,386 A | 4/1979 | Stopler | 297/362 |
| 4,457,557 A | 7/1984 | Une | 297/362 |
| 4,747,641 A | 5/1988 | Bell | 297/379 |
| 4,765,680 A | 8/1988 | Kawashima | 297/367 |
| 4,822,100 A | 4/1989 | Bell | 297/367 |
| 4,875,735 A | 10/1989 | Moyer et al. | 297/367 |
| 5,393,116 A * | 2/1995 | Bolsworth et al. | 296/65.03 |
| 5,690,386 A * | 11/1997 | Chabanne | 297/367 |
| 5,718,481 A | 2/1998 | Robinson | 297/367 |
| 5,899,533 A * | 5/1999 | Tatematsu et al. | 297/367 |
| 6,113,190 A * | 9/2000 | Negi et al. | 297/378.1 |
| 6,139,104 A * | 10/2000 | Brewer | 297/353 |
| 6,199,953 B1 * | 3/2001 | Chen | 297/367 |
| 6,209,955 B1 * | 4/2001 | Seibold | 297/216.13 |
| 6,353,970 B1 * | 3/2002 | Spaeth | 16/360 |

(Continued)

FOREIGN PATENT DOCUMENTS

EP    0 758 592 A1    8/1995

*Primary Examiner*—Anthony D. Barfield
*Assistant Examiner*—Erika Garrett
(74) *Attorney, Agent, or Firm*—Gifford, Krass, Sprinkle, Anderson & Citkowski, P.C.

(57) ABSTRACT

A seatback assembly including a frame exhibiting a side-disposed and arcuate edge. An arm is pivotally secured to the frame. A pawl is in turn pivotally secured to the arm and is biased in engaging fashion relative to the arcuate extending edge via alternating and mating teeth and recess configurations established between the pawl and along at least one of first and second spaced apart locations defined along the arcuate edge. A cam is mounted to a further location of the seatback arm and biases the pawl against the frame. The cam is actuated to cause the pawl to disengage from the first configured sector location, the seatback arm pivoting towards the seat frame, whereupon the pawl matingly engages the second location along the arcuate seat sector edge to lock the seatback in a forwardly rotated and stowed position relative to the seat frame.

14 Claims, 3 Drawing Sheets

U.S. PATENT DOCUMENTS

| | | | |
|---|---|---|---|
| 6,371,557 B1 * | 4/2002 | Holloway | 297/367 |
| 6,447,066 B1 * | 9/2002 | Chabanne et al. | 297/367 |
| 6,511,129 B1 * | 1/2003 | Minor et al. | 297/367 |
| 6,540,297 B2 * | 4/2003 | Hansel et al. | 297/367 |
| 6,543,850 B1 * | 4/2003 | Becker et al. | 297/367 |
| 6,550,864 B1 | 4/2003 | Zarna et al. | 297/378.12 |
| 6,659,558 B2 | 12/2003 | Sugimoto | 297/367 |
| 6,685,270 B2 * | 2/2004 | Haglund | 297/367 |
| 6,733,076 B2 * | 5/2004 | Grable et al. | 297/362 |
| 6,860,562 B2 * | 3/2005 | Bonk | 297/378.12 |
| 6,883,869 B2 | 4/2005 | Liu et al. | 297/367 |
| 6,910,739 B2 * | 6/2005 | Grable et al. | 297/378.12 |

* cited by examiner

SEAT ASSEMBLY INCLUDING A TOOTHED PAWL INTERENGAGEABLE WITH A SEATBACK

BACKGROUND OF THE INVENTION

1. Field of the Invention

The present invention relates to pivotally adjustable seatback arrangements, particularly for use in vehicles. More specifically, the present invention discloses an alternating and mating tooth and recess relationship, established between a cam-operated pawl pivotally secured to a seatback arm and an arcuate extending edge of a seat frame sector. The pawl is actuated by the cam to be interengageable with first and second arcuately offset locations along the seat frame sector, corresponding with upright and forwardly pivoted locations of the seatback arm relative to the seat frame.

2. Description of the Prior Art

The prior art is well documented with examples of seatback adjustment assemblies. U.S. Pat. No. 4,147,386, issued to Stolper, teaches a motor vehicle seat having a pivotal hinge fitting with a fixed component connected to a seat portion, a pivotal component connected to a backrest, a pivot pin connecting the fixed component to the pivoted component, and a toothed part rotatably mounted on the pivot pin. Fine-adjustment means on the pivotable component are operable to pivot the pivotable component to adjust the angle of the backrest relative to the seat portion.

The pivotal hinge fitting also includes means on the fixed component to limit turning of the toothed part in a direction corresponding to movement of the backrest away from the seat portion. Of note, an inertia pawl is mounted on the fixed component and engageable with the toothed part to prevent the movement of the backrest towards the seat portion.

U.S. Pat. No. 4,457,557, issued to Une, teaches a reclining device for use in a vehicle seat in which an intermediate bracket is rotatably supported on an eccentric shaft between a stationary bracket secured to a vehicle seat cushion and a movable bracket secured to a seatback. The stationary bracket and intermediate bracket are operatively connected together by a stepwisely adjustable engaging mechanism operable by an operation lever. A differential reduction gearing mechanism includes internal and external gears having the same pitch and differing in tooth number are interposed between the intermediate bracket and the movable bracket and a spiral spring acts between the stationary bracket and the intermediate bracket to urge the movable bracket so that the seatback is urged upwardly forwardly.

Sugimoto, U.S. Pat. No. 6,659,558, teaches a seat reclining device having a base plate secured to a seat cushion, an arm member secured to a seatback, upper and lower tooth plates pivotally mounted on a base plate and provided with upper and lower teeth, a cam member pivotally mounted on the base plate, and at least one support for the lower tooth plate. When the cam member moves the lower tooth plate in a direction to bring the lower teeth into contact with the upper teeth, the upper tooth plate is locked together with the arm member so that the seatback becomes unable to pivot relative to the seat cushion. In a locked position, the support supports the end portion of the lower tooth plate so as to maintain the engagement of the upper and lower teeth. Thus, the seat reclining device can lock the seatback with improved strength.

Moyer, U.S. Pat. No. 4,875,735, teaches a hinge fitting for a reclining seat structure which includes a fixed support bracket, a seatback member, a locking member and a lock actuating mechanism. The lock actuating mechanism includes a cam with two cam arms which move the locking member into locking and unlocking position. The shape and positioning of the cam result in a hinge fitting that is resistant to unlocking in response to a force applied to the seatback. The operator for the lock actuating mechanism is mounted remotely from the intersection of the seat and seatback.

Finally, U.S. Pat. No. 5,718,481, issued to Robinson, for a seat recliner mechanism. A single release handle adjusts the reclination angle of the seatback as well as dumping the seatback in a forwardly folded position. The recliner mechanism enables the reclining and forward folding motion to operate about a common axis or independent axes. The recliner mechanism is capable of latching the seatback in the forward folded position, thus making the mechanism convenient for use with removable seats. The same release handle may also be used to release the seatback from the forwardly folded position.

SUMMARY OF THE PRESENT INVENTION

The present invention discloses a seatback assembly for securely pivoting a seatback arm relative to a seat bottom between first upright and second folded positions. The assembly includes a frame exhibiting a side sector with an arcuate extending and upper edge. Typically, identical left and right side assemblies are provided for each seat and include side sectors mounted within associated side disposed frame stanchions.

A seatback arm is pivotally secured to each associated side sector and in overlapping fashion relative at least to the arcuate extending sector edges. Each assembly further includes a pawl pivotally mounted to the seatback arm and matingly engaging between first and second extending locations along the arcuate sector edge corresponding to an upright engaged position of the seatback arm relative the seat sector. Specifically, opposing facing surfaces of the pawl and at least one location along the seat frame sector edge exhibit alternating and mating tooth and recess configurations.

The pawl extends substantially opposite from the associated teeth and recess configuration and further includes a centralized and cam receiving depression. The pawl depression separates a first projection located proximate to a pawl mounting rivet, and from a second stepped projection. A portion of a rotatable cam seats within the receiving depression of the pawl and biases the same in engaging fashion against the seat frame sector. The cam further includes first and second spaced apart and downwardly extending projections and which coact with the first and second spaced projections of the pawl, dependent upon a direction of rotation of the cam.

The cam is in turn rotatably slaved to a lever, actuation of the lever rotating the cam, causing the pawl to disengage from the first configured sector location. The seatback arm is then pivoted towards the seat frame, whereupon the pawl matingly re-engages the seat sector edge at a second arcuately spaced location therealong and corresponding to a seatback folded position relative to the seat frame.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
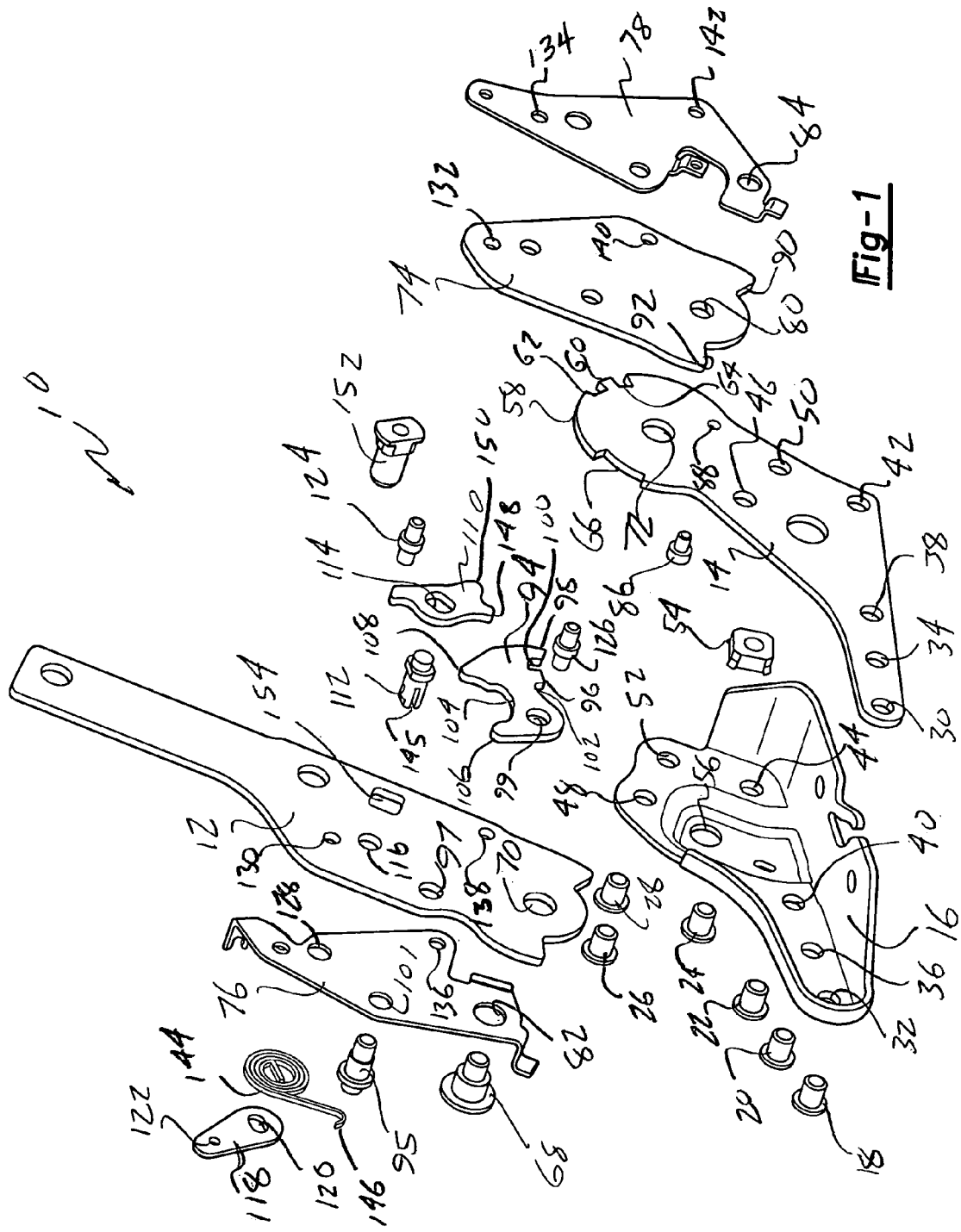
FIG. 1 is an exploded view of the seatback assembly according to the present invention.
Figure 2:
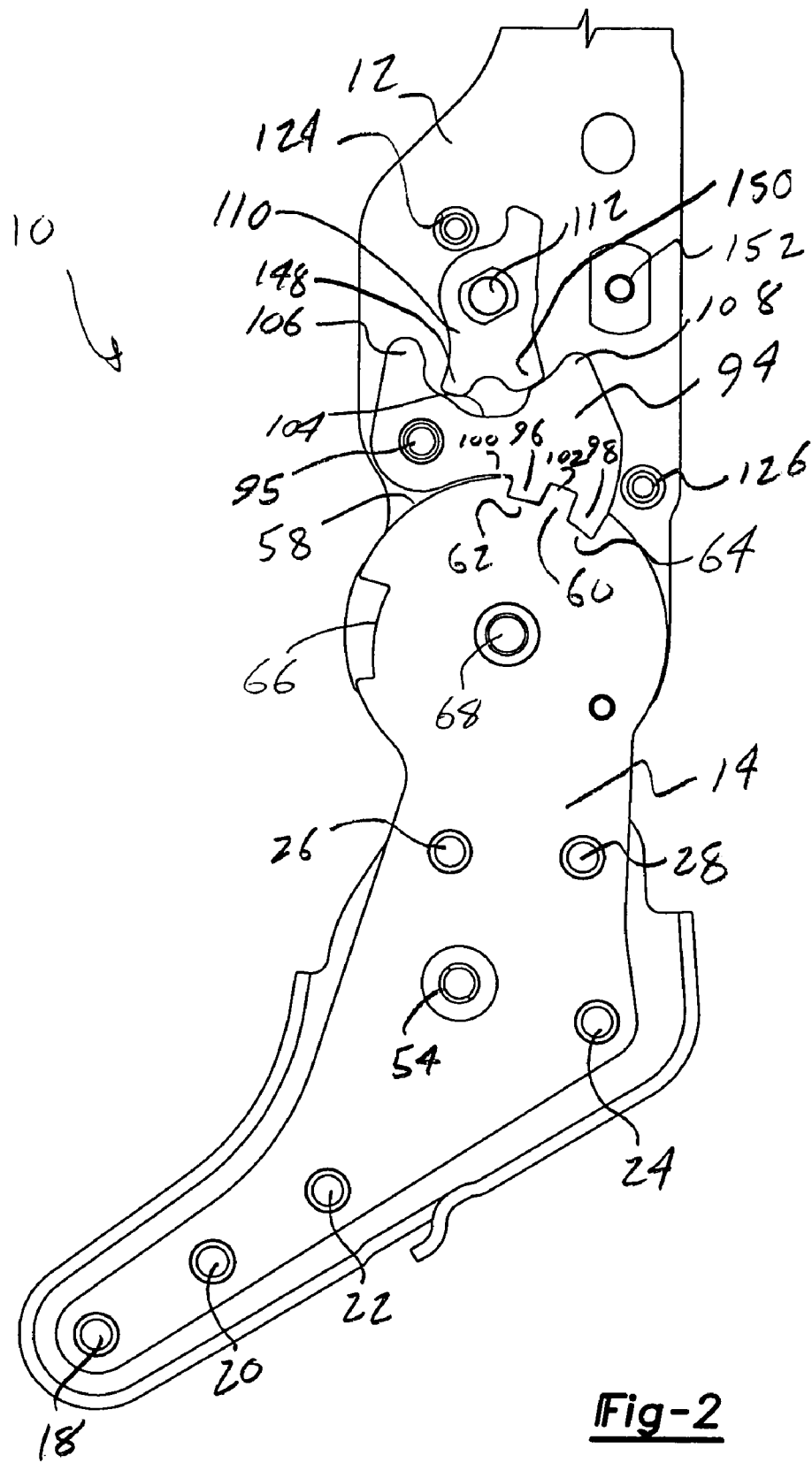
FIG. 2 is an assembled plan view of the seatback assembly according to FIG. 1 in an engaged position and with the cover plate and inside bracket trim components removed.
Figure 3:
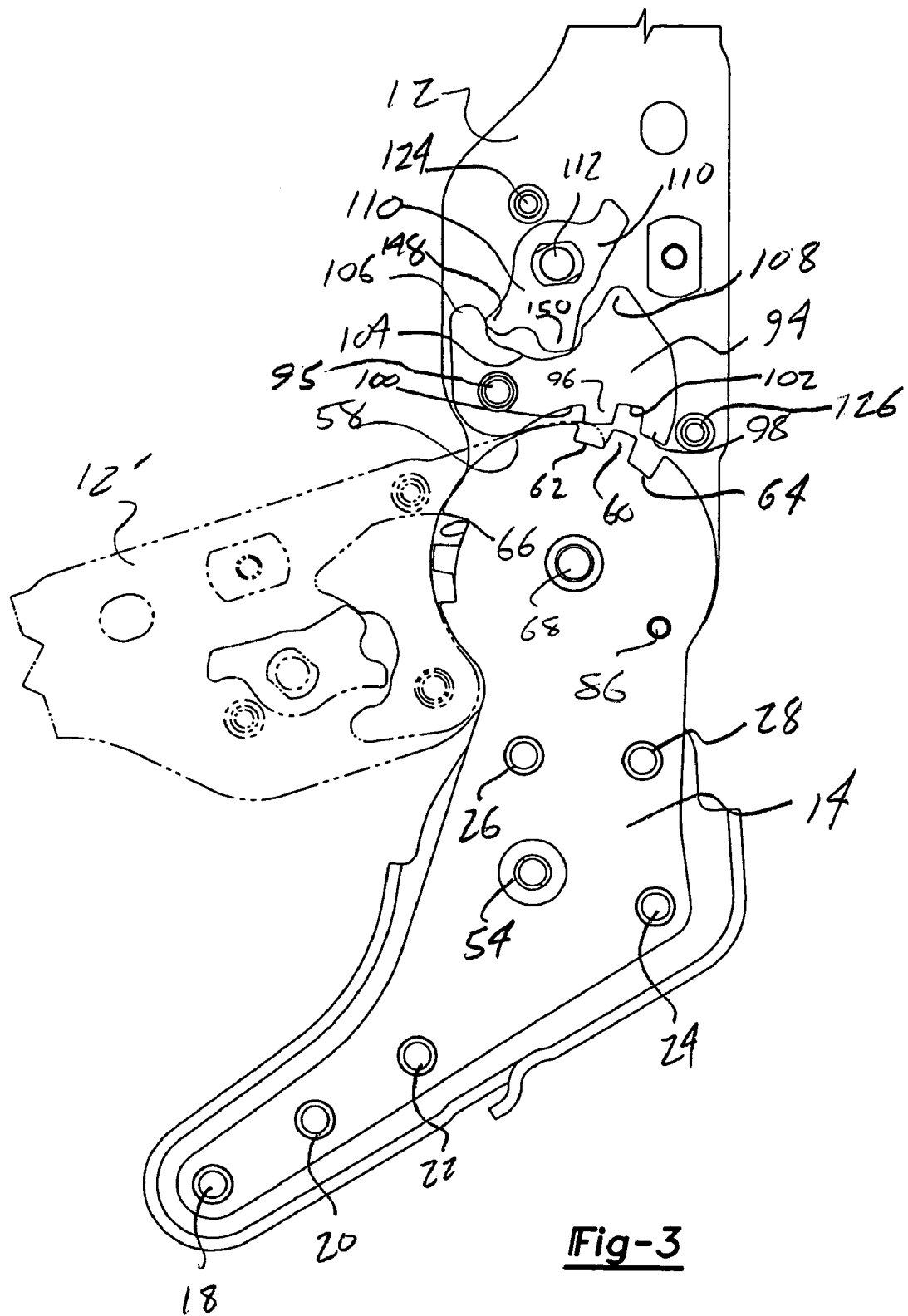
FIG. 3 is a succeeding plan view illustration showing the cam and pawl arrangement in a succeeding disengaging position and further showing the seatback arm rotated to a forward phantom illustration according to the present invention.

Referring now to FIGS. 1-3, a series of exploded and plan view illustrations are shown at 10 of a pivotally adjustable seatback arrangement, particularly for use in vehicles. The seatback assembly is constructed for securely pivoting a seatback arm 12 relative to a seat frame, as best illustrated in FIG. 1 as including a side disposed seat frame sector 14 and an associated support stanchion 16, and between first upright and second folded positions.

As also explained previously, and although not specifically illustrated, the seatback assembly typically includes identical pairs of left and right side assemblies, associated with each vehicle seat. For purposes of ease of explanation, the detailed illustration of FIGS. 1-3, accompanied by the following description, is limited to a single side-disposed assembly.

As shown in each of FIGS. 1-3, the seat frame side sector 14 exhibits a substantially flattened and durable metal, such as in one preferred variant an SAE 4130 steel. The sector 14 is secured to the substantially three-dimensional shaped frame support stanchion 16 (also constructed of an SAE grade steel) via a plurality of rivets 18, 20, 22, 24, 26 and 28, these securing through corresponding and mating pairs of apertures 30 & 32, 34 & 36, 38 & 40, 42 & 44, 46 & 48, and 50 & 52. A nut 54 is welded into place over a further location corresponding to aperture 56 and which is defined in the stanchion support 16.

The sector 14 includes an arcuate extending and upper edge 58. Typically again, identical left and right side assemblies are provided for each seat (not shown) and include corresponding side sectors mounted within associated side disposed frame stanchions.

Defined at a first exposed location of the sector extending edge 58 is a first configuration of alternating teeth 60 and recesses 62 and 64. Further defined at a second arcuately offset (forward) location is a second configuration 66 in the form of a continuous and recess defined along the sector edge.

The seatback arm 12 (constructed of a likewise SAE grade steel and exhibiting a generally elongate and stamped steel construction) is pivotally secured against its associated side sector 14, in overlapping fashion relative at least to the arcuate extending sector edges, such as by a main pivot pin 68 which extends through apertures 70 and 72 defined in the seatback arm 12 and seat frame sector 14, respectively.

As will be further described in additional detail, a cover plate 74 and outer sandwiching bracket trim plates 76 and 78 are secured over the pivotal connection between the arm 12 and sector 14, these including additional aligning apertures 80, 82 and 84, respectively, through which is matingly inserted the main pivot pin 68. A stop pin 86 extends from the side sector (see engaging aperture 88) and engages first and second configured edge locations 90 and 92 of the cover plate 74 to define both fully upright and forwardly folded positions of the seatback arm 12.

Each assembly further includes a pawl 94 pivotally mounted, see by pin 95 extending through apertures 97 and 99, to the seatback arm 12 (the pin 95 also passing through an additional and mating aperture 101 associated with the trim bracket 76). A surface of the pawl 94 opposing the seat sector edge 58 exhibits a teeth 96 and 98 and alternating recess 100 and 102 configuration which matingly engages with either the first and second extending locations defined along the arcuate sector edge 58 (see as best shown in FIG. 3) and corresponding to both the upright engaged 12 and forwardly folded 12' positions of the seatback arm 12 relative the seat sector 14.

The upright engaging configuration established between the pawl 94 and the mating tooth 60 and recesses 62 and 64 provides the strongest degree of support, as evident by the fully mating configuration established with the pawl teeth 96 and 98 and recesses 100 and 102. The pawl 94 further provides an acceptable degree of holding force when reseated within the continuous arcuate recess 66 corresponding to the folded position 12'.

The pawl 94 extends substantially opposite from the associated teeth and recess configuration and further includes a centralized and cam receiving depression 104. The pawl depression 104 separates a first projection 106 located proximate to the pawl mounting rivet 95 from a second stepped projection 108.

A cam 110 is mounted in substantially coplanar and engaging fashion relative to the pawl 94, and by a keyed pivot lever 112 securing through apertures 114 associated with the cam 110 and at 116 associated with the seatback arm 12 (see as best shown in FIG. 1). Rotation of the cam 110 is slaved by a lever 118, this further including an aperture 120 through which a projecting location of the pivot lever 112 seats.

Although not shown, a cable secures to an offset extending location (see aperture 122) associated with the lever 118 and, upon rotating of the lever 118, the cam 110 slavingly rotates in a likewise direction. As also best shown in FIG. 1, additional spacer rivets 124 and 126 are provided for sandwiching the seatback arm 12, seat frame sector 14, pawl 94 and cam 110 in coplanar fashion and between the outer trim bracket 76 and the inner disposed cover plate 74 and associated trim bracket 78 (see also aligning sets of apertures 128-134 and 136-142).

As illustrated in each of the plan illustrations of FIGS. 2 and 3, a portion of a rotatable cam 110 seats within the receiving depression 104 of the pawl 94 and biases the same in engaging fashion against the seat frame sector 14. The biasing effect is provided by a clock spring 144 (again FIG. 1) biasing the lever 118 and slaved cam 110 in a selected and engaging rotational direction. The clock spring 144 secures upon an exterior surface of the outer bracket trim plate 76 arranged opposite the cam and pawl, and such that an extending and keyed shaft portion, see at 145, of the pivot 112 seats therein a central extending location of the coil defining the clock spring 144. An opposite curled end 146 of the spring 144 engages a projecting location of the rotating pin 95 supporting the pawl 94 and to provide a seating location to rotationally bias the spring 144.

The projecting location of the cam 110 includes first 148 and second 150 spaced apart and downwardly extending projections, these coacting with the first and second spaced projections 106 and 108 associated with the pawl 94, and dependent upon a direction of rotation of the cam 110. The cam 110 is illustrated in a first configuration and upright engaged position in FIG. 2 and by which the cam projection 150 abuts a shouldered location of the opposing pawl projection 108, and in order to force the tooth 96 and 98 and alternating recess 102 and 104 arrangement of the pawl 94 in engagement with the mating tooth 60 and recess 62 and 64 arrangement exhibited upon the seat frame sector 14.

Referring to FIG. 3, actuation of the lever 118 slavingly rotates the cam 110 (in the cw direction), causing the pawl 94 to be pivoted about is mounting location 95, and via the coaction between the projection 148 of the cam acting upon the opposing projection 106 of the pawl 94. This causes the pawl 94 to rotate slightly in the ccw direction, resulting in the disengagement of the mating teeth and recess arrangement. The seatback arm 12 is then caused to pivoted towards the seat frame (or fold), whereupon the pawl 94 matingly re-engages the seat sector edge 58 at its second arcuately spaced location (see again continuous recess 66) defined therealong and corresponding to a seatback folded position relative to the seat frame.

Although not shown, an additional spring arrangement can be provided for rotating the seatback arm forwardly relative to the seat bottom. Additional features associated with the assembly include an armrest pin 152 exhibiting a square head and secured to an inner facing surface of the seatback arm (see keyed aperture 154 in FIG. 1) offset from the cam 110.

Having described our invention, other and additional preferred embodiments will become apparent to those skilled in the art to which it pertains, and without deviating from the scope of the appended claims.

We claim:

1. A seatback assembly, comprising:
   a frame exhibiting a side-disposed and arcuate edge;
   an arm pivotally secured to said frame;
   a pawl pivotally secured to said arm and biased in engaging fashion relative to said arcuate extending edge via an alternating and mating teeth and recess configuration established between said pawl and along at least one of first and second spaced apart locations defined along said arcuate edge and which are separated by an arcuate surface portion;
   a rivet for pivotally mounting said pawl at a generally elongated end location of said pawl and which is at a spaced location from said alternating teeth and recess configuration, a surface of said pawl extending substantially opposite from said associated teeth and recess configuration further comprising a centralized and cam receiving depression;
   a cam mounted to a further location of said seatback arm and biasing said pawl against said frame; and
   said cam being actuated to cause said pawl to disengage from said first configured sector location, said seatback arm pivoting towards said seat frame and across said surface portion, whereupon said pawl matingly engages said spaced apart second location along said arcuate seat sector edge.

2. The seatback assembly as described in claim 1, said pawl depression separating a first projection located proximate to said pawl mounting rivet from a second stepped projection.

3. The seatback assembly as described in claim 2, a portion of said cam seating within said receiving depression of said pawl further comprising first and second spaced apart and downwardly extending projections and which coact with said first and second spaced projections of said pawl dependent upon a direction of rotation of said cam.

4. A seatback assembly for securely pivoting a seatback arm relative to a seat bottom, comprising:
   a seat frame including a side sector exhibiting an arcuate upper edge;
   the seatback arm pivotally secured to said side sector and overlapping said arcuate upper edge;
   a pawl pivotally mounted to said seatback arm and matingly engaging a first location along said arcuate sector edge corresponding to an upright engaged position of said seatback arm relative said seat sector;
   a cam mounted to a further location of said seatback arm and biasing said pawl in said engaged position; and
   said cam being rotatably slaved to a lever, a clock spring biasing said lever and slaved cam in a selected and engaging rotational direction, said clock spring securing upon an exterior surface of an outer bracket trim plate arranged opposite said cam and pawl; and
   a cover plate secured a parallel spaced distance from said seatback arm and sandwiching therebetween said seat sector arcuate edge, said cam and said pawl, a stop pin extending from said side sector and engaging first and second configured edge locations of said cover plate to define fully upright and forwardly folded positions of said seatback arm;
   actuation of said lever rotating said cam, causing said pawl to disengage from said first configured sector location, said seatback arm pivoting towards said seat frame along a surface portion associated with said upper arcuate edge, whereupon said pawl matingly engages a second spaced apart location along said arcuate seat sector edge corresponding to a seatback folding position of the seatback relative to the seat bottom.

5. The seatback assembly as described in claim 4, further comprising a keyed pivot cam lever rotatively slaving said cam to said lever.

6. The seatback assembly as described in claim 4, further comprising a second inside bracket trim plate overlaying said cover plate and arranged opposite said outer bracket trim plate.

7. The seatback assembly as described in claim 4, further comprising a main pivot pin extending through aligning apertures defined in said seatback arm, seat frame sector, said cover plate, and said inner and outer bracket trim plates.

8. A setback assembly for securely pivoting a setback arm relative to a seat bottom, comprising:
   a seat frame including a side sector exhibiting an arcuate upper edge;
   the seatback arm pivotally secured to said side sector and overlapping said arcuate upper edge;
   a pawl pivotally mounted to said seatback arm and matingly engaging a first location along said arcuate sector edge corresponding to upright engaged position of said seatback arm relative said seat sector;
   a cam mounted to a further location of said seatback arm and biasing said pawl in said engaged position;
   said cam being rotatably slaved to a lever, actuation of said lever rotating said cam, causing said pawl to disengage from said first configured sector location, said seatback arm pivoting towards said seat frame along a surface portion associated with said upper arcuate edge, whereupon said pawl matingly engages a second spaced apart location along said arcuate seat sector edge corresponding to a seatback folding position of the seatback relative to the seat bottom; and
   at least one of said first and second mating locations further comprising alternating teeth and recesses established between opposing locations of said pawl and said arcuate sector edge, said second configured location along said arcuate sector edge further comprising a continuous arcuate recess seating said teeth and recess configuration exhibited by said pawl.

9. The seatback assembly as described in claim 8, said seat frame further comprising a support stanchion to which is secured said side sector via a plurality of rivets.

10. A seatback assembly for securely pivoting a seatback arm relative to a seat bottom, comprising:
   a seat frame including a side sector exhibiting an arcuate upper edge;
   the seatback arm pivotally secured to said side sector and overlapping said arcuate upper edge;
   a pawl pivotally mounted to said seatback arm and matingly engaging a first location along said arcuate sector edge corresponding to an upright engaged position of said seatback arm relative said seat sector;
   a cam mounted to a further location of said seatback arm and biasing said pawl in said engaged position;
   said cam being rotatably slaved to a lever, actuation of said lever rotating said cam, causing said pawl to disengage from said first configured sector location, said seatback arm pivoting towards said seat frame along a surface portion associated with said upper arcuate edge, whereupon said pawl matingly engages a second spaced apart location along said arcuate seat sector edge corresponding to a seatback folding position of the seatback relative to the seat bottom;
   at least one of said first and second mating locations further comprising alternating teeth and recesses established between opposing locations of said pawl and said arcuate sector edge; and
   a rivet for pivotally mounting said pawl at a generally elongated end location of said pawl and which is at a spaced location from said alternating teeth and recess configuration, a surface of said pawl extending substantially opposite from said associated teeth and recess configuration further comprising a centralized and cam receiving depression.

11. The seatback assembly as described in claim 10, said pawl depression separating a first projection located proximate to said pawl mounting rivet from a second stepped projection.

12. The seatback assembly as described in claim 11, a portion of said cam seating within said receiving depression of said pawl further comprising first and second spaced apart and downwardly extending projections and which coact with said first and second spaced projections of said pawl dependent upon a direction of rotation of said cam.

13. A seatback assembly for securely pivoting a seatback arm relative to a seat bottom, comprising:
   a seat frame including a side sector exhibiting an arcuate upper edge;
   the seatback arm pivotally secured to said side sector and overlapping said arcuate upper edge;
   a pawl pivotally mounted to said seatback arm and matingly engaging a first location along said arcuate sector edge corresponding to an upright engaged position of said seatback arm relative said seat sector;
   a cam mounted to a further location of said seatback arm and biasing said pawl in said engaged position;
   said cam being rotatably slaved to a lever, actuation of said lever rotating said cam, causing said pawl to disengage from said first configured sector location, said seatback arm pivoting towards said seat frame along a surface portion associated with said upper arcuate edge, whereupon said pawl matingly engages a second spaced apart location along said arcuate seat sector edge corresponding to a seatback folding position of the seatback relative to the seat bottom;
   at least one of said first and second mating locations further comprising alternating teeth and recesses established between opposing locations of said pawl and said arcuate sector edge, said second configured location along said arcuate sector edge further comprising a continuous arcuate recess seating said teeth and recess configuration exhibited by said pawl.

14. A seatback assembly for securely pivoting a seatback arm relative to a seat bottom, comprising:
   a seat frame including a side sector exhibiting an arcuate upper edge;
   the seatback arm pivotally secured to said side sector and overlapping said arcuate upper edge;
   a pawl pivotally mounted to said seatback arm and matingly engaging a first location along said arcuate sector edge corresponding to an upright engaged position of said seatback arm relative said seat sector;
   a cam mounted to a further location of said seatback arm and biasing said pawl in said engaged position;
   an armrest pin exhibiting a square head and secured to an inner facing surface of said seatback arm offset from said cam; and
   said cam being rotatably slaved to a lever, actuation of said lever rotating said cam, causing said pawl to disengage from said first configured sector location, said seatback arm pivoting towards said seat frame along a surface portion associated with said upper arcuate edge, whereupon said pawl matingly engages a second spaced apart location along said arcuate seat sector edge corresponding to a seatback folding position of the seatback relative to the seat bottom.

* * * * *